(12) United States Patent
Oshima

(10) Patent No.: US 11,143,894 B2
(45) Date of Patent: Oct. 12, 2021

(54) DISPLAY DEVICE

(71) Applicant: Saturn Licensing LLC, New York, NY (US)

(72) Inventor: Nobuki Oshima, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/309,263

(22) PCT Filed: May 17, 2017

(86) PCT No.: PCT/JP2017/018539
§ 371 (c)(1),
(2) Date: Dec. 12, 2018

(87) PCT Pub. No.: WO2018/012107
PCT Pub. Date: Jan. 18, 2018

(65) Prior Publication Data
US 2019/0265539 A1     Aug. 29, 2019

(30) Foreign Application Priority Data

Jul. 15, 2016   (JP) .............................. JP2016-139989

(51) Int. Cl.
*G02F 1/1333*     (2006.01)
*G02F 1/13357*     (2006.01)
(Continued)

(52) U.S. Cl.
CPC .. *G02F 1/133308* (2013.01); *G02F 1/133603* (2013.01); *G02F 1/133605* (2013.01);
(Continued)

(58) Field of Classification Search
CPC ......... G02F 1/133308; G02F 1/133603; G02F 1/133605; G02F 2001/133314;
(Continued)

(56) References Cited

U.S. PATENT DOCUMENTS 6,490,016 B1 * 12/2002 Koura ............... G02F 1/133308
349/58
8,240,863 B2 * 8/2012 Takeuchi .......... G02F 1/133308
362/97.1
(Continued)

FOREIGN PATENT DOCUMENTS

CN           1841141 A     10/2006
CN       101097345 A      1/2008
(Continued)

OTHER PUBLICATIONS

International Search Report corresponding to PCT/JP2107/018539, dated Aug. 22, 2017, 3 pgs.
(Continued)

*Primary Examiner* — Tsion Tumebo
(74) *Attorney, Agent, or Firm* — Lerner, David, Littenberg, Krumholz & Mentlik, LLP

(57) ABSTRACT

There is provided a display device having a configuration suitable for increasing a screen size and reducing a thickness while ensuring adequate strength. The display device includes: a frame structure having a plurality of extrusion molded members coupled to one another; a display panel; and an intermediate member attached to the frame structure and holding the display panel.

12 Claims, 13 Drawing Sheets

(51) Int. Cl.
  *G09F 9/30* (2006.01)
  *G09F 9/00* (2006.01)
(52) U.S. Cl.
  CPC .................. *G09F 9/00* (2013.01); *G09F 9/30* (2013.01); *G02F 1/13332* (2021.01); *G02F 1/133314* (2021.01); *G02F 1/133317* (2021.01); *G02F 1/133328* (2021.01)
(58) Field of Classification Search
  CPC .......... G02F 2001/133317; G02F 2001/13332; G02F 2001/133328; G09F 9/00; G09F 9/30
  See application file for complete search history.

(56) References Cited

U.S. PATENT DOCUMENTS

| | | | | |
|---|---|---|---|---|
| 8,467,008 | B2* | 6/2013 | Chang | G02B 6/0068 349/58 |
| 8,896,996 | B2* | 11/2014 | Sakamoto | G02F 1/133308 361/679.24 |
| 8,985,796 | B2* | 3/2015 | Li | G02F 1/133603 362/97.1 |
| 2004/0150981 | A1* | 8/2004 | Katsuda | G02F 1/133615 362/620 |
| 2005/0168954 | A1* | 8/2005 | Kim | G02F 1/133308 361/725 |
| 2006/0055839 | A1* | 3/2006 | Hirao | G02F 1/133308 349/58 |
| 2008/0237430 | A1 | 10/2008 | Kakuta | |
| 2009/0262554 | A1* | 10/2009 | Lee | G02F 1/133308 362/633 |
| 2010/0053874 | A1 | 3/2010 | Yukawa et al. | |
| 2010/0079977 | A1 | 4/2010 | Lee et al. | |
| 2010/0195015 | A1 | 8/2010 | Okitsu | |
| 2010/0301714 | A1* | 12/2010 | Ishibashi | H05K 5/02 312/111 |
| 2012/0147592 | A1 | 6/2012 | Takase | |
| 2012/0320303 | A1 | 12/2012 | Shi | |
| 2013/0126450 | A1* | 5/2013 | Kuo | G02F 1/133308 211/26 |
| 2013/0128152 | A1* | 5/2013 | Li | G02F 1/133308 349/15 |
| 2014/0125913 | A1* | 5/2014 | Lee | G02F 1/133308 349/58 |
| 2014/0168563 | A1 | 6/2014 | Tang et al. | |
| 2014/0226102 | A1 | 8/2014 | Zhang | |
| 2016/0027718 | A1 | 1/2016 | Park et al. | |
| 2016/0076734 | A1 | 3/2016 | Chen et al. | |
| 2016/0081203 | A1 | 3/2016 | Tsai et al. | |
| 2016/0219491 | A1 | 7/2016 | Sakurai et al. | |

FOREIGN PATENT DOCUMENTS

| | | |
|---|---|---|
| CN | 102422076 A | 4/2012 |
| CN | 101206348 B | 5/2012 |
| CN | 102506395 A | 6/2012 |
| CN | 102402046 B | 5/2014 |
| CN | 102829450 B | 6/2014 |
| CN | 102798093 B | 6/2015 |
| CN | 103547109 B | 11/2017 |
| EP | 2741129 A1 | 6/2014 |
| EP | 2913707 A1 | 9/2015 |
| JP | 2004086046 A | 3/2004 |
| JP | 2008241964 A | 10/2008 |
| JP | 2010002486 A | 1/2010 |
| JP | 2010015098 A | 1/2010 |
| JP | 2010061202 A | 3/2010 |
| JP | 2010276908 A | 12/2010 |
| JP | 2012141385 A | 7/2012 |
| JP | 2014063195 A | 4/2014 |
| JP | 2016139989 A | 8/2016 |
| WO | 2013152551 A1 | 10/2013 |

OTHER PUBLICATIONS

Chinese Search Report for Application No. 201780038867.8 dated Sep. 3, 2020, 3 pages.

"National Vocational Qualification Training Course—Furniture Designer", First Edition, edited by Chen Feijian, China Furniture Association, China Light Industry Press, Beijing, Sep. 30, 2014, pp. 90-91.

* cited by examiner

[FIG. 1]
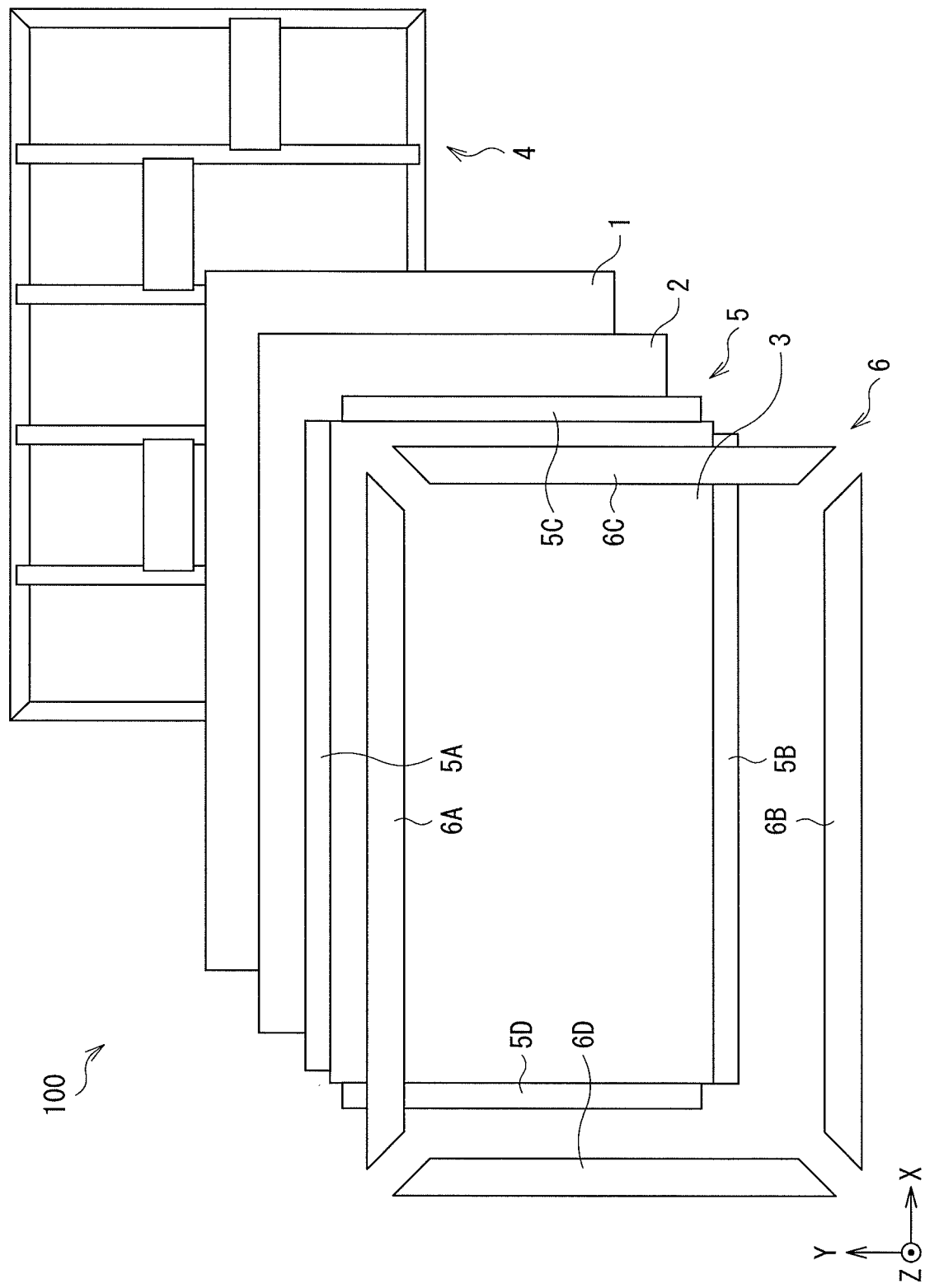

[ FIG. 2 ]
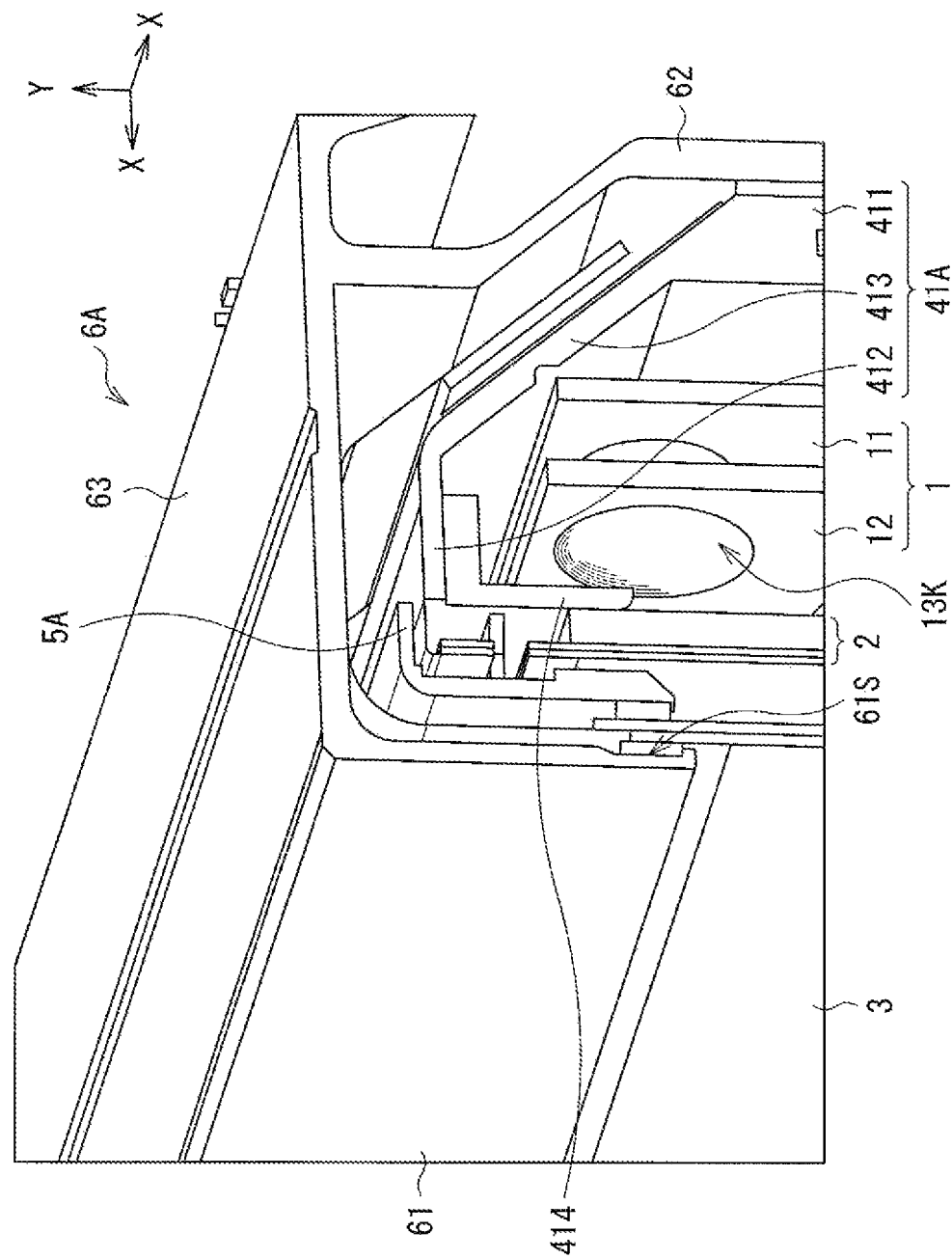

[ FIG. 3 ]
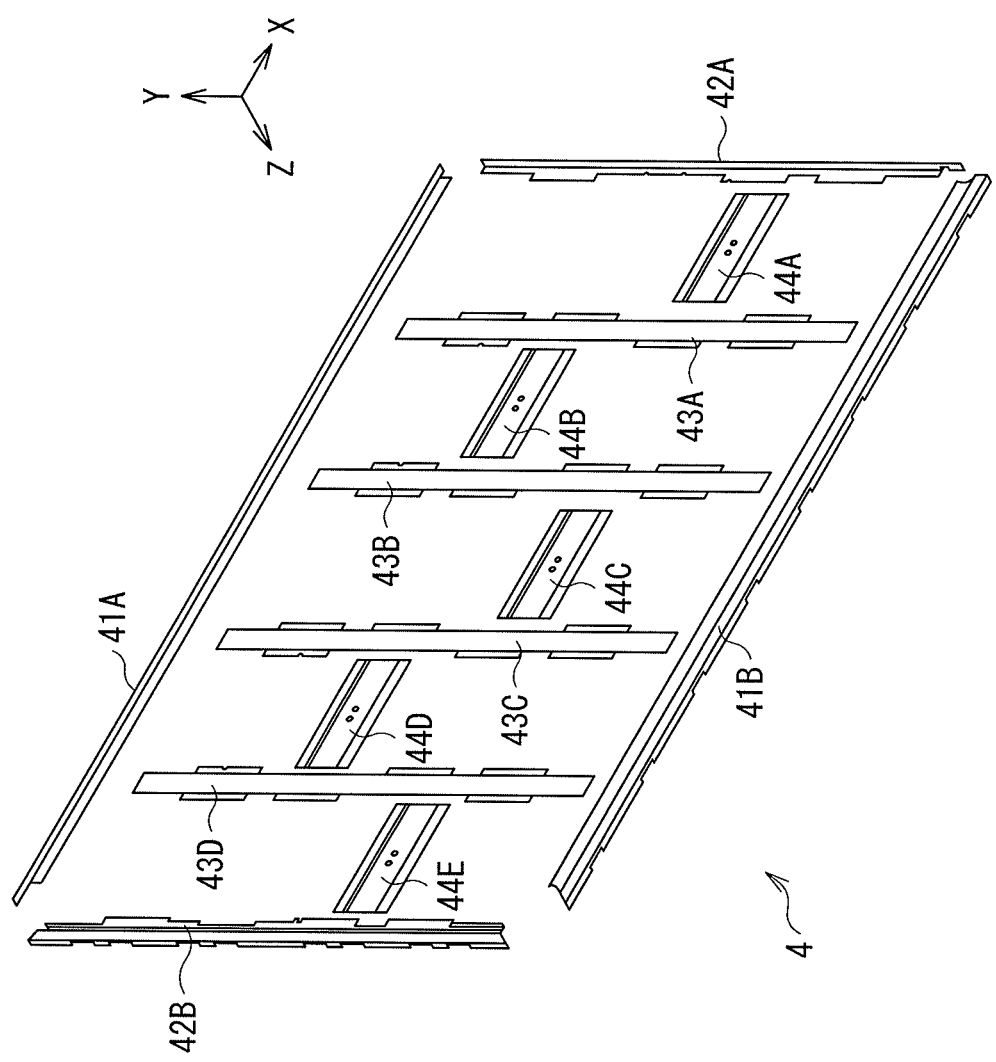

[ FIG. 4A ]
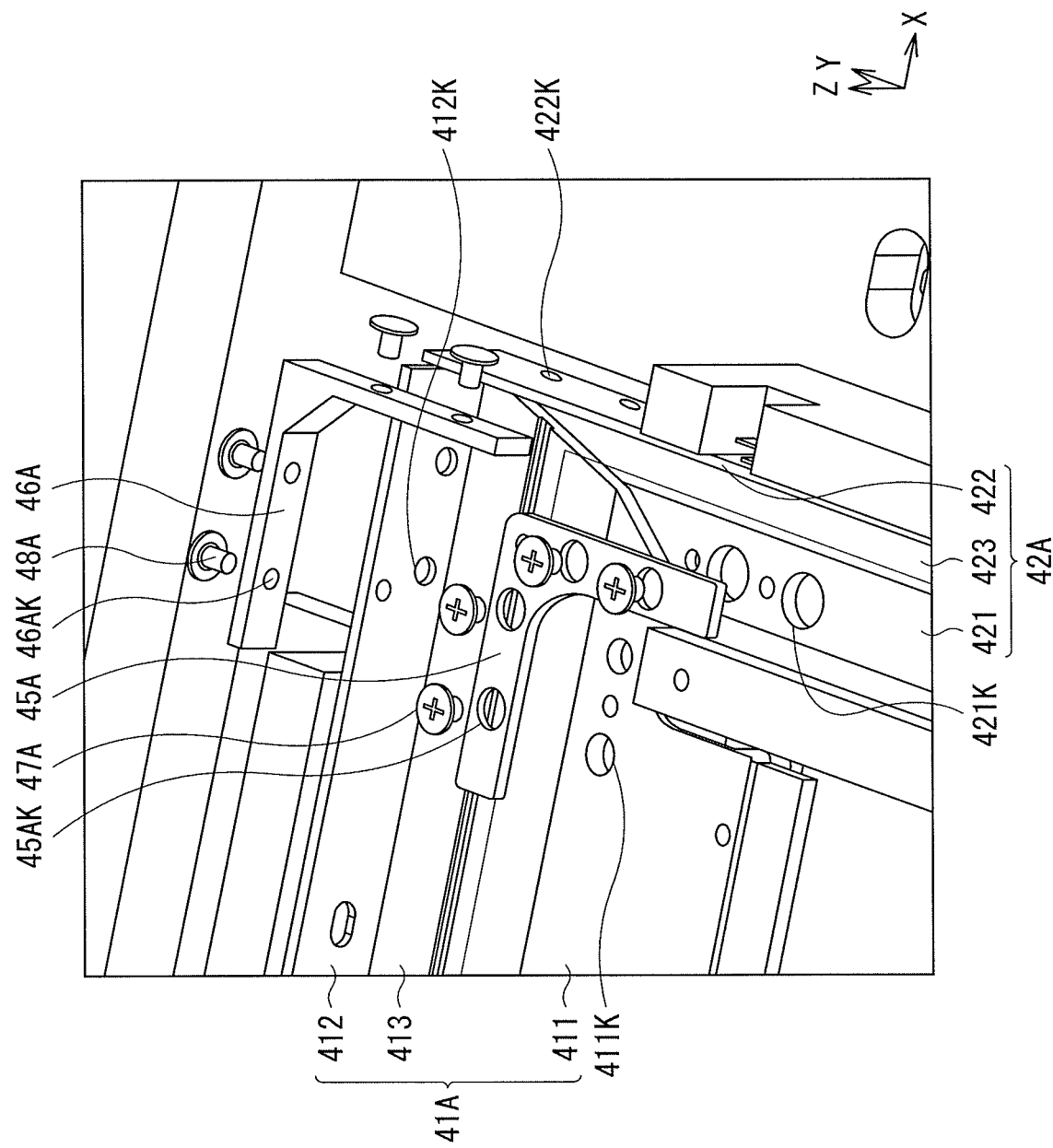

[ FIG. 4B ]
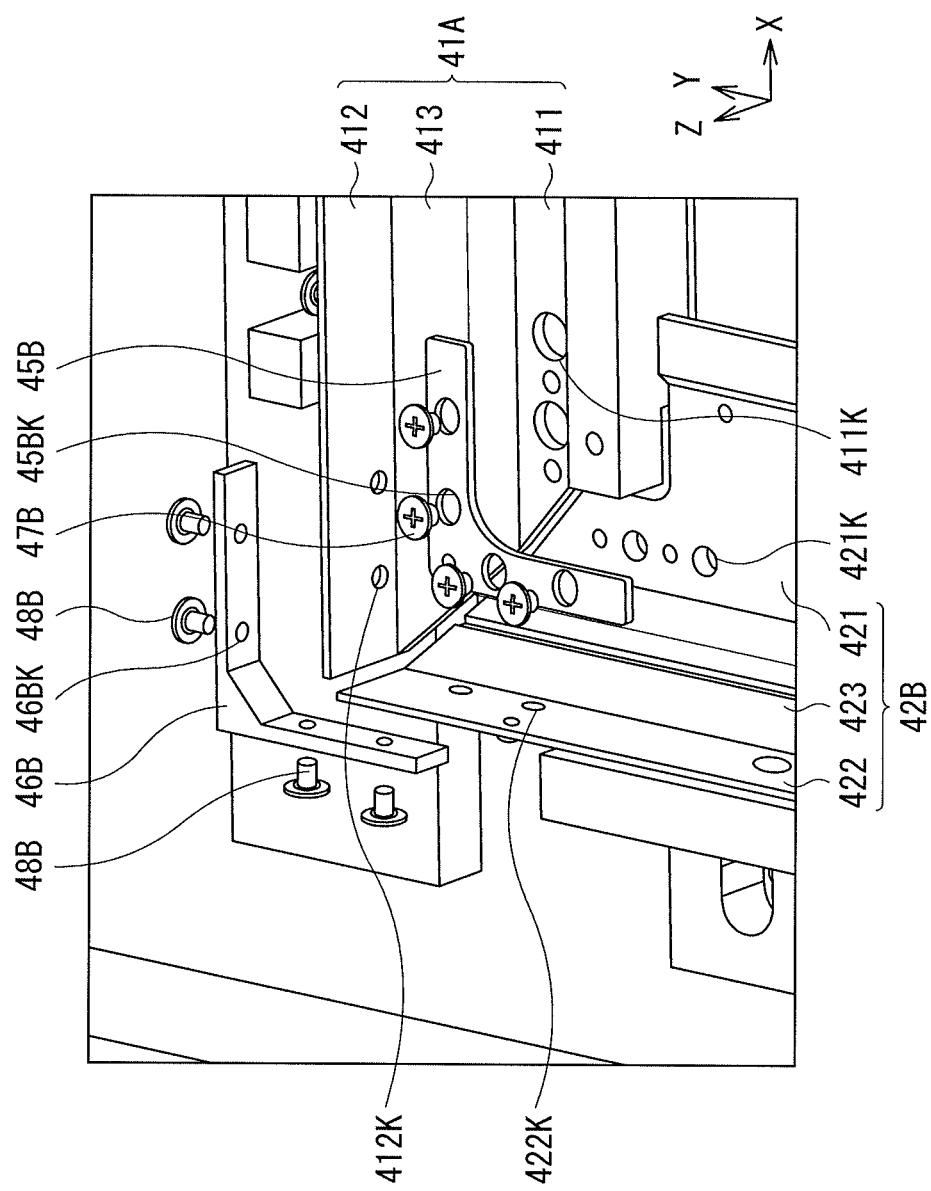

[FIG. 5A]
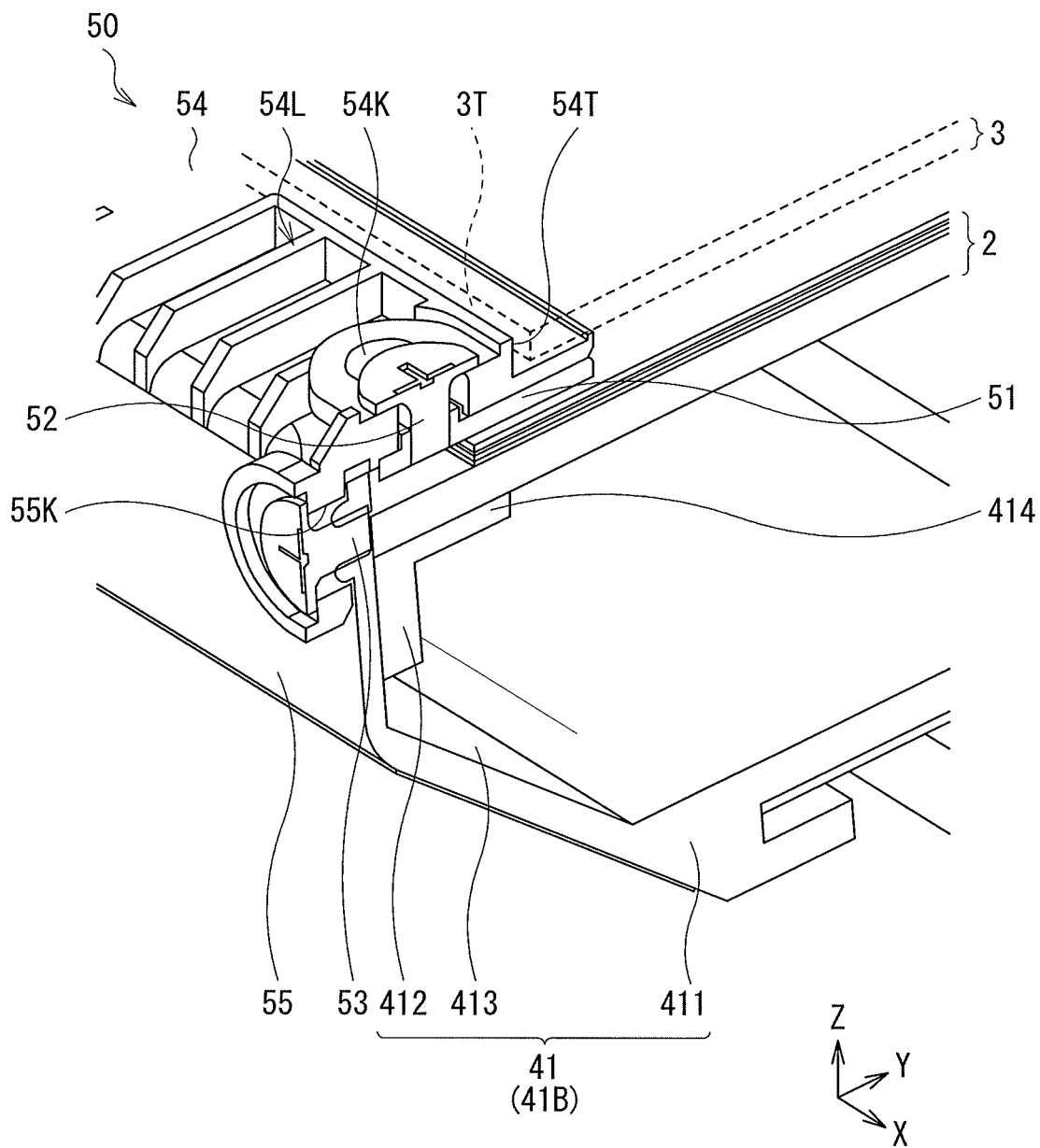

[ FIG. 5B ]
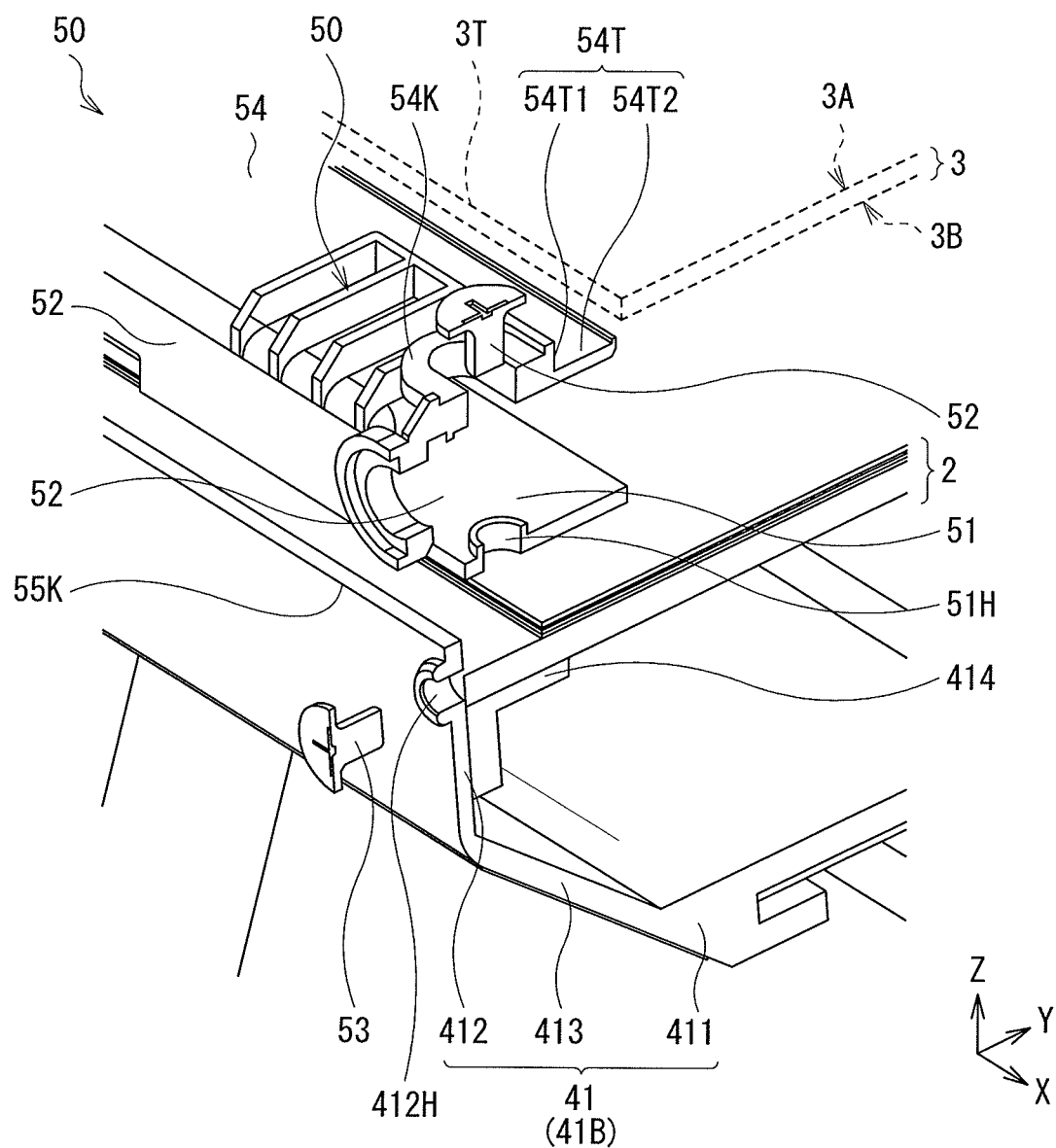

[ FIG. 6 ]
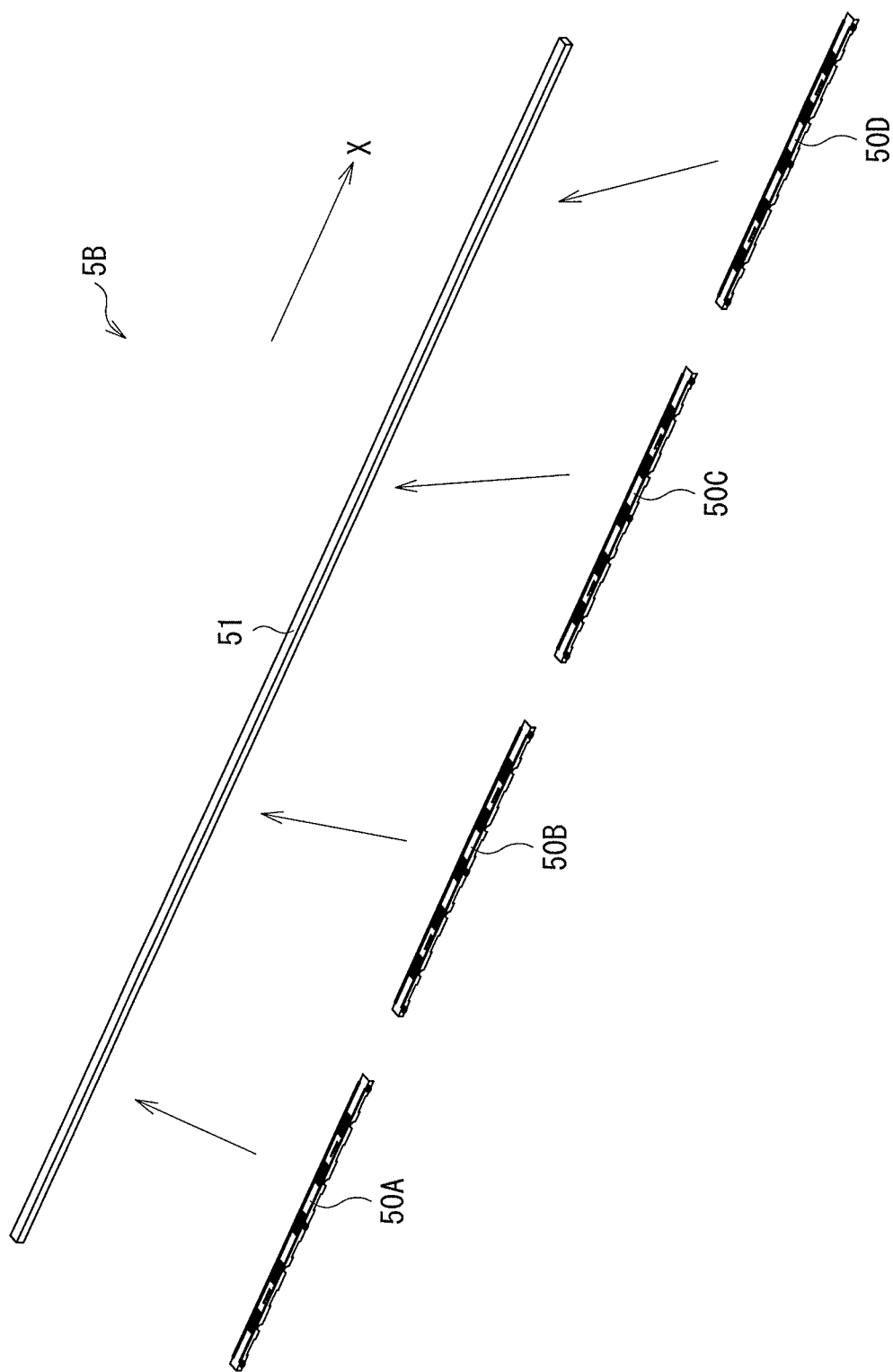

[ FIG. 7A ]
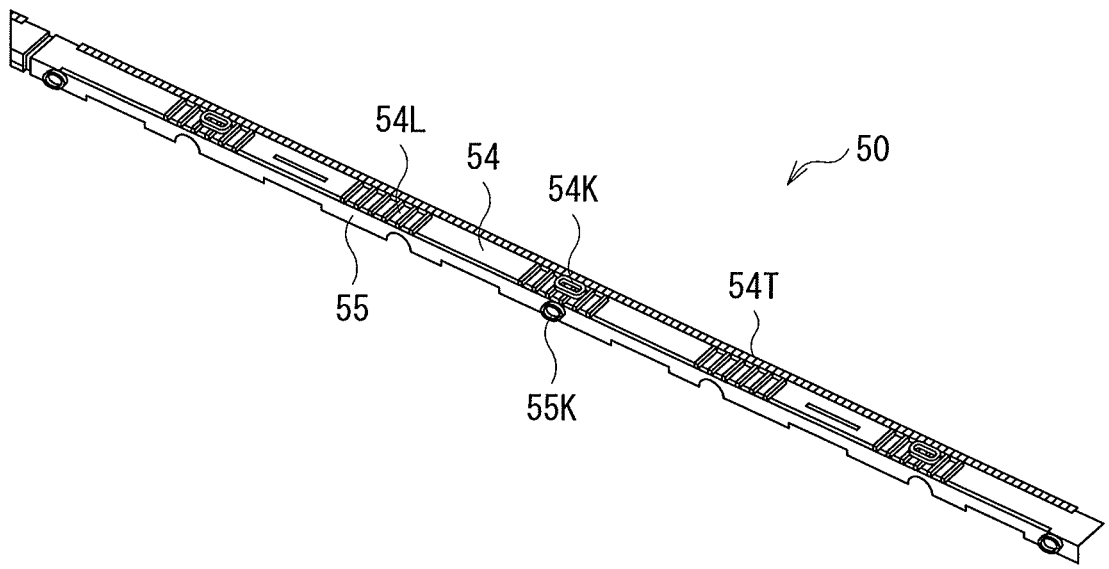
[ FIG. 7B ]
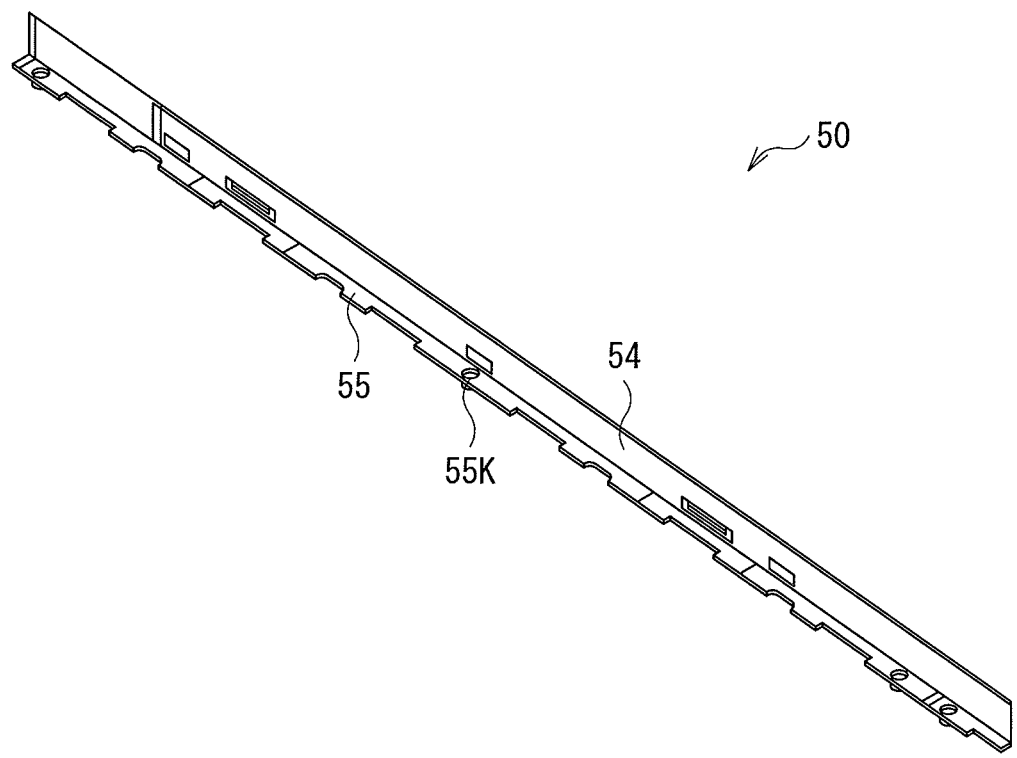

[FIG. 8]
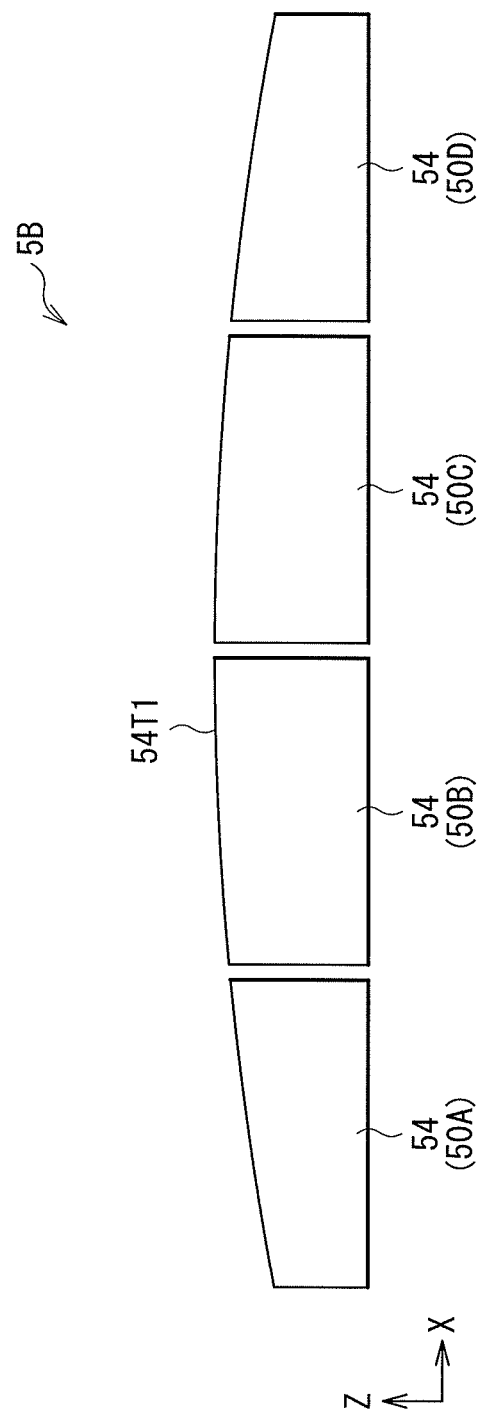

[FIG. 9]
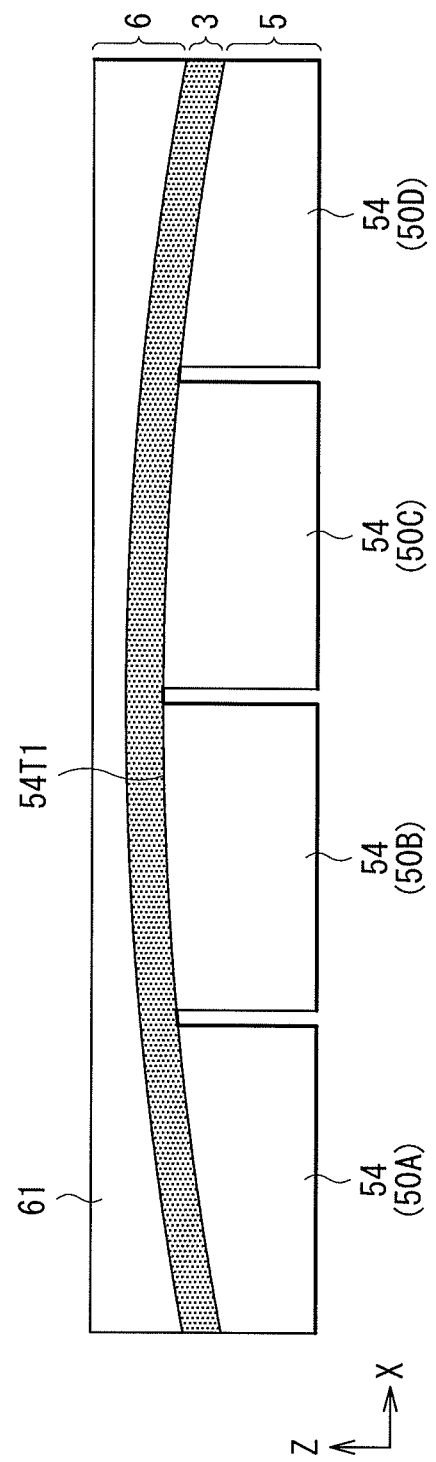

[ FIG. 10 ]
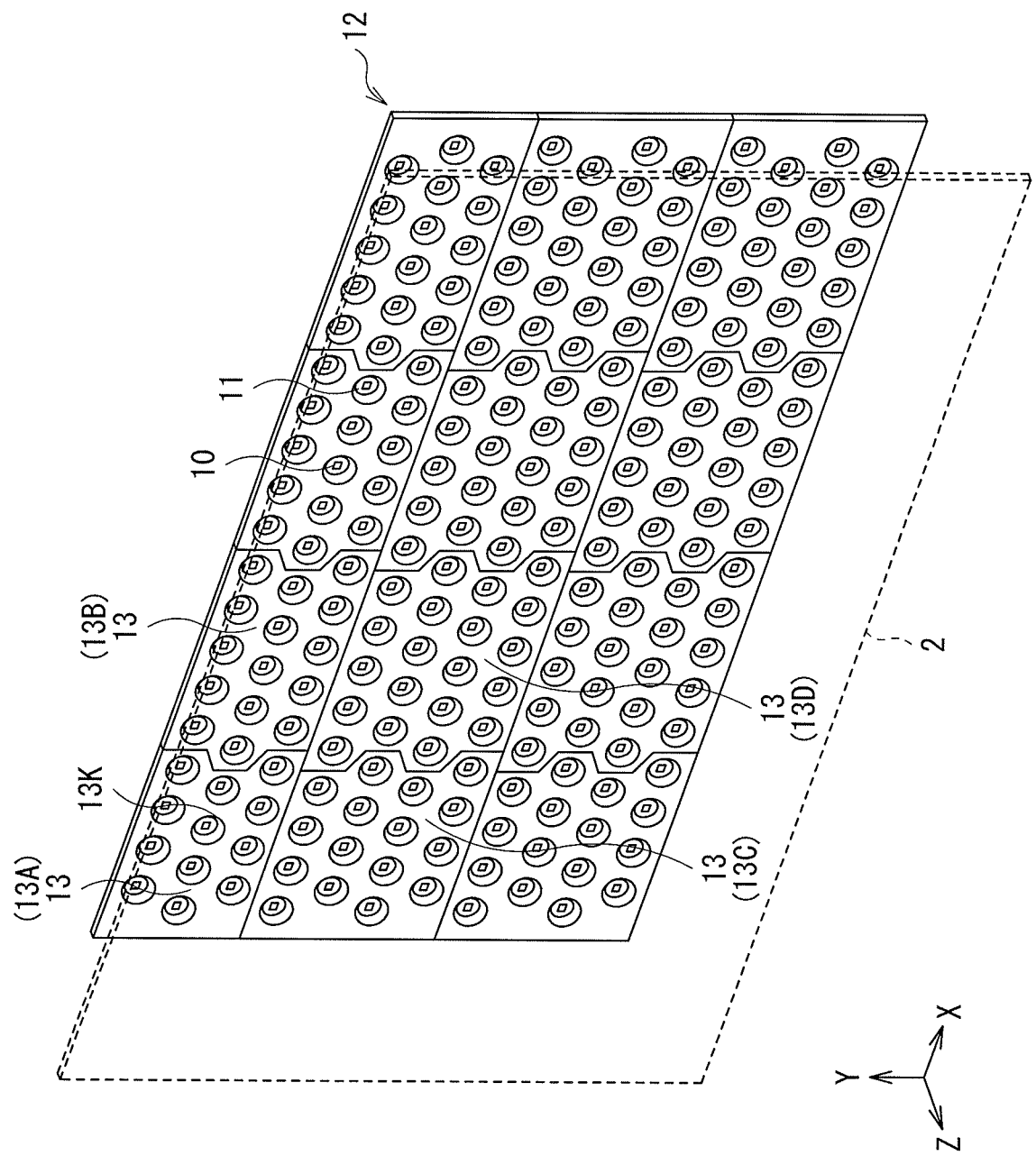

[ FIG. 11A ]
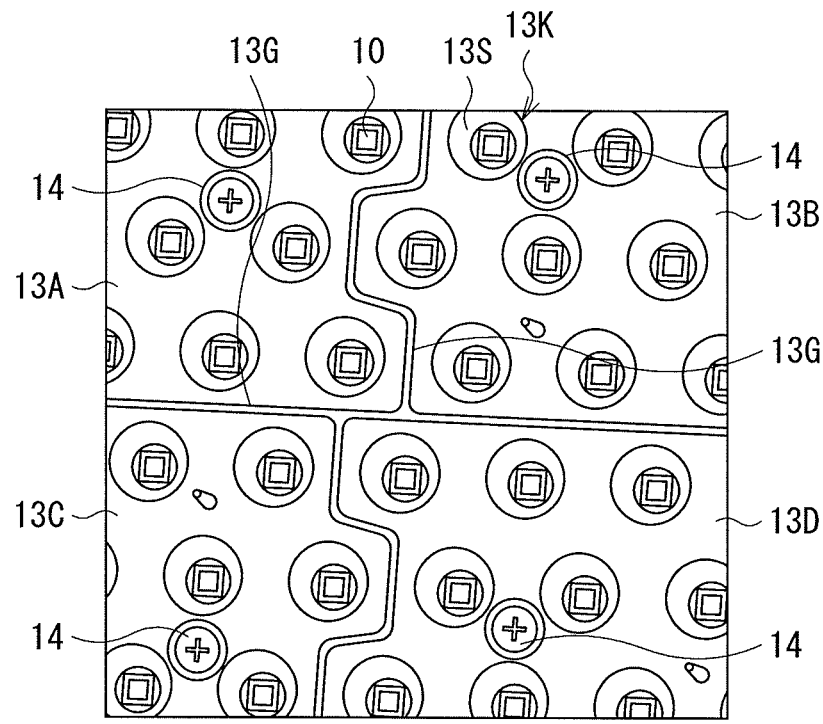
[ FIG. 11B ]
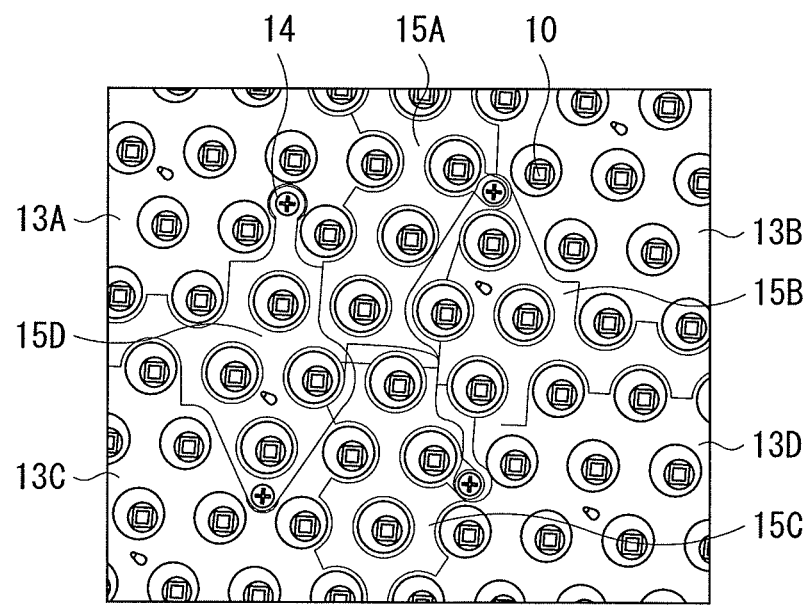

DISPLAY DEVICE

CROSS-REFERENCE TO RELATED APPLICATIONS

This application is a national phase entry under 35 U.S.C. § 371 of International Application No. PCT/JP2017/018539 filed May 17, 2017, which claims the priority from Japanese Patent Application No. 2016-139989 filed in the Japanese Patent Office on Jul. 15, 2016, the entire contents of which are hereby incorporated by reference.

TECHNICAL FIELD

The present disclosure relates to a display device.

BACKGROUND ART

There has been proposed a display device being thin yet having a large screen size (see PTLs 1 to 3, for example).

CITATION LIST

Patent Literature

PTL 1: Japanese Unexamined Patent Application Publication No. 2004-86046
PTL 2: Japanese Unexamined Patent Application Publication No. 2010-15098
PTL 3: Japanese Unexamined Patent Application Publication No. 2012-141385

SUMMARY OF THE INVENTION

Recent display devices have a notably increased screen size and a notably reduced thickness. However, the increased screen size and the reduced thickness of such display devices make it difficult to ensure strength of the display devices themselves.

Thus, it is desirable to provide a display device having a configuration suitable for increasing the screen size and reducing the thickness while ensuring adequate strength.

A display device according to an embodiment of the present disclosure includes: a frame structure having a plurality of extrusion molded members coupled to one another; a display panel; and an intermediate member attached to the frame structure and holding the display panel.

In the display device according to the embodiment of the present disclosure, the display panel is held by the frame structure having the plurality of extrusion molded members coupled to one another via the intermediate member. This makes it possible to suppress increase of a weight of the display device itself due to the increased screen size compared to, for example, a display device in which the display panel is held by a housing fabricated by molding a single sheet metal. Thus, deformation is less likely to be caused by its own weight despite its thin shape.

According to the display device of the embodiment of the present disclosure, adoption of the frame structure makes it possible to prevent deformation caused by its own weight accompanied by the increased screen size and the reduced thickness. This makes it possible to achieve a configuration suitable for increasing the screen size and reducing the thickness while ensuring adequate strength.

It is to be noted that the effects of the present disclosure are not limited thereto, and may include any of the effects described below.

BRIEF DESCRIPTION OF DRAWING

FIG. 1 is a perspective views of an overall configuration example of a display device according to an embodiment of the present disclosure.

FIG. 2 is a cross-sectional view of an internal configuration example of a main part of the display device illustrated in FIG. 1.

FIG. 3 is an exploded perspective view of an overall configuration example of a back chassis illustrated in FIG. 1.

FIG. 4A is an enlarged perspective view of a portion of the back chassis illustrated in FIG. 1.

FIG. 4B is an enlarged perspective view of another portion of the back chassis illustrated in FIG. 1.

FIG. 5A is an enlarged perspective view of a vicinity of a middle chassis illustrated in FIG. 1.

FIG. 5B is an enlarged exploded perspective view of the vicinity of the middle chassis illustrated in FIG. 1.

FIG. 6 is an exploded external perspective view of the middle chassis illustrated in FIG. 1.

FIG. 7A is a perspective view of an external appearance of a component of the middle chassis illustrated in FIG. 6.

FIG. 7B is another perspective view of the external appearance of the component of the middle chassis illustrated in FIG. 6.

FIG. 8 is a schematic cross-sectional view of a cross-section of a portion of the middle chassis illustrated in FIG. 6.

FIG. 9 is a schematic cross-sectional view of a cross-section of a periphery of the display panel illustrated in FIG. 1.

FIG. 10 is a perspective view of an overall configuration example of a light emitter illustrated in FIG. 1.

FIG. 11A is an enlarged perspective view of a reflection member illustrated in FIG. 10.

FIG. 11B is another enlarged perspective view of the reflection member illustrated in FIG. 10.

MODES FOR CARRYING OUT THE INVENTION

In the following, embodiments of the present disclosure are described in detail with reference to the drawings. It is to be noted that description is made in the following order.
1. Embodiment and Modification Example Thereof
An example of a display device including a back chassis having a frame structure.
2. Other Modification Examples

1. Embodiment

[Configuration of Display Device 100]

FIG. 1 illustrates an overall configuration of a display device 100 according to an embodiment of the present disclosure. FIG. 2 is a cross-sectional view of an internal configuration example of a main part of the display device 100 illustrated in FIG. 1. The display device 100 is used as a flat-panel television set, for example, and includes a light emitter 1, an optical sheet 2, and a display panel 3 overlapped one another in this order toward an observer (viewer) side. The display device 100 further includes a back chassis 4, a middle chassis 5, and a bezel 6. It is to be noted that in the display device 100, a direction in which the light emitter 1, the optical sheet 2, and the display panel 3 are disposed is regarded as a Z-axis direction. Moreover, in a plane perpendicular to the Z-axis direction, a longitudinal direction is regarded as an X-direction and a short direction is regarded as a Y-direction.

(Back Chassis 4)

FIG. 3 is an exploded perspective view of an overall configuration example of the back chassis 4. The back chassis 4 is a frame structure having a plurality of extrusion molded members coupled to one another. Such a configuration achieves higher strength with light weight, as compared to a configuration in which the back chassis includes one or more flat plates, for example. Specifically, as illustrated in FIG. 3, for example, a pair of beams 41 (41A and 41B), a pair of pillars 42 (42A and 42B), and a plurality of sub-pillars 43 (43A to 43D) may be specific examples of the extrusion molded member. The beam 41A and the beam 41B are members both extending in a horizontal direction (the X-axis direction). The beam 41A is disposed along an upper end edge of each of the light emitter 1, the optical sheet 2, and the display panel 3, and the beam 41B is disposed along a lower end edge of each of the light emitter 1, the optical sheet 2, and the display panel 3. In contrast, the pillar 42A and the pillar 42B are members both extending in a vertical direction (the Y-axis direction). The pillar 42A is disposed along a right end edge of each of the light emitter 1, the optical sheet 2, and the display panel 3 as seen from the observer, and the pillar 42B is disposed along a left end edge of each of the light emitter 1, the optical sheet 2, and the display panel 3 as seen from the observer.

FIGS. 4A and 4B each are an exploded perspective view of a configuration example of a main part of the back chassis 4, and respectively illustrate enlargements of a coupling portion between the beam 41A and the pillar 42A and a coupling portion between the beam 41A and the pillar 42B. The beam 41A includes a base 411 extending display device the X-axis direction in an XY plane, a wall 412 extending toward the X-axis direction in an XZ plane, and an inclined section 413 joining the base 411 and the wall 412. The beam 41B has substantially the same configuration as the beam 41A. Moreover, each of the pair of pillars 42A, 42B includes a base 421 extending toward the Y-axis direction in the XY plane, a wall 422 extending toward the Y-axis direction in the YZ plane, and an inclined section 423 joining the base 421 and the wall 422.

As illustrated in FIG. 4A, a right end of the beam 41A and an upper end of the pillar 42A are coupled together by an L-shaped metal fitting 45A, an L-shaped metal fitting 46A, screws 47A, and screws 48A. Specifically, the base 411 and the base 421 are fastened together by the common L-shaped metal fitting 45A and the respective screws 47A, and the wall 412 and the wall 422 are fastened by the common L-shaped metal fitting 46A and the respective screws 48A. The L-shaped metal fitting 45A has a plurality of holes 45AK through which the screws 47A pass. The base 411 on the right end of the beam 41A and the base 421 on the upper end of the pillar 42A respectively have a plurality of holes 411K and a plurality of holes 421K through which the screws 47A pass at positions corresponding to the plurality of holes 45AK. The L-shaped metal fitting 46A has a plurality of holes 46AK through which the screws 48A pass. The wall 412 and the wall 422 respective have a plurality of holes 412K and a plurality of holes 422K through which the screws 48A pass at positions corresponding to the plurality of holes 46AK.

Similarly, as illustrated in FIG. 4B, a left end of the beam 41A and an upper end of the pillar 42B are coupled together by an L-shaped metal fitting 45B, an L-shaped metal fitting 46B, screws 47B, and screws 48B. Specifically, the base 411 and the base 421 are fastened together by the common L-shaped metal fitting 45B and the respective screws 47B, and the wall 412 and the wall 422 are fastened together by the common L-shaped metal fitting 46B and the respective screws 48B. The L-shaped metal fitting 45B has a plurality of holes 45BK through which the screws 47A pass. The base 411 on the left end of the beam 41A and the base 421 on the upper end of the pillar 42B respectively have a plurality of holes 411K and a plurality of holes 421K through which the screws 48B pass at positions corresponding to the plurality of holes 45BK. The L-shaped metal fitting 46B has a plurality of holes 46BK through which the screws 48B pass. The wall 412 and the wall 422 respectively have a plurality of holes 412K and a plurality of holes 422K through which the screws 48B pass at positions corresponding to the plurality of holes 46BK.

The plurality of holes 411K are preferably long holes extending in the X-axis direction, and the plurality of holes 421K are preferably long holes extending in the Y-axis direction. Alternatively, dimensions of the holes 421K in the X-axis direction and the Y-axis direction may be made larger than those of the holes 45AK in the X-axis direction and the Y-axis direction. This is to make it possible to easily adjust overall dimensions of the back chassis 4 resulting from a dimensional error of each extrusion molded member.

It is to be noted that a configuration of a coupling portion between the beam 41B and the pillar 42A and a configuration of a coupling portion between the beam 41B and the pillar 42B are substantially the same as those illustrated in FIGS. 4A and 4B. Accordingly, detailed description thereof is omitted.

Moreover, each of the plurality of sub-pillars 43 (43A to 43D) is a member extending in the vertical direction (the Y-axis direction) so as to join the beam 41B and the beam 41B, and the sub-pillars 43 are equally spaced in the X-axis direction, for example, between the pillar 42A and the pillar 42B. The sub-pillars 43 (43A to 43D) each are fixed to the beam 41A and the beam 41B at both ends thereof in the Y-axis direction by screws or the like.

The back chassis 4 may further include a plurality of sub-beams 44 (44A to 44E) extending in the horizontal direction so as to join the plurality of sub-pillars 43 to one another.

It is to be noted that a rib extending in its longitudinal direction may be formed in at least one of the pair of beams 41 (41A and 41B), the pair of pillars 42 (42A and 42B), or the plurality of sub-pillars 43 (43A to 43D). This makes it possible to further increase strength while reducing the thickness of each extrusion molded member.

Moreover, the pair of beams 41 (41A and 41B), the pair of pillars 42 (42A and 42B), and the plurality of sub-pillars 43 (43A to 43D) may include, for example, a highly rigid metallic material such as stainless steel, or may include aluminum, titanium, magnesium, or the like alone or an alloy including these elements, thereby reducing weights thereof. Further, the pair of beams 41 (41A and 41B), the pair of pillars 42 (42A and 42B), and the plurality of sub-pillars 43 (43A to 43D) also have applicability of fiber-reinforced plastics (FRP: Fiber-Reinforced Plastics). Furthermore, the pair of beams 41 (41A and 41B), the pair of pillars 42 (42A and 42B), and the plurality of sub-pillars 43 (43A to 43D) are extrusion molded members formed by extrusion molding, which allows the back chassis 4 to have a configuration having higher manufacturability.

(Middle Chassis 5)

The middle chassis 5 is an intermediate member that is attached to the back chassis 4 and hold the display panel 3.

For example, the middle chassis 5 are disposed at four points in the display device 100, as illustrated in FIG. 1. Among them, for example, one extending in the X-axis direction along an upper end of the display panel 3 is referred to as a middle chassis 5A, one extending in the X-axis direction along a lower end of the display panel 3 is referred to as a middle chassis 5B, one extending in the Y-axis direction along a right end of the display panel 3 is referred to as a middle chassis 5C, and one extending in the Y-axis direction along a left end of the display panel 3 is referred to as a middle chassis 5D. The middle chassis 5A to 5D have a substantially same configuration. Accordingly, description is given below with use of the middle chassis 5B as a representative example.

FIG. 5A is an enlarged cross-sectional perspective view of a portion of the middle chassis 5B, and FIG. 5B is an exploded cross-sectional perspective view thereof. FIG. 6 is an exploded perspective view of an overall configuration example of the middle chassis 5B. FIG. 7A is an enlarged perspective view of an external appearance of a single piece as a component of the middle chassis 5B as seen from outside of the display device 100, and FIG. 7B is an enlarged perspective view of an external appearance of the piece 50 as seen from inside of the display device 100.

The middle chassis 5B includes a substrate 51 extending along an outer edge of the display panel 3 and having, for example, a strip shape, and a plurality of pieces 50 (50A to 50D) disposed along a longitudinal direction of the substrate 51 and held by the substrate 51 to make respective relative positions to the substrate 51 adjustable (FIGS. 5A, 5B, and 6).

Each of the plurality of pieces 50 includes a locking section 54T (FIGS. 5A and 5B). In detail, as illustrated in FIG. 5B, the locking section 54T includes a wall surface 54T1 serving as an abutment surface that abuts an end surface 3T of the display panel 3 and a bottom surface 54T2 that supports a periphery of a back surface 3B of the display panel 3. The plurality of pieces 50 are held by the substrate 51 in a state in which the relative positions thereof to the substrate 51 are adjusted to include the respective wall surfaces 54T1 substantially in a same plane. The substrate 51 includes, for example, a highly rigid material such as stainless steel. Each of the plurality of pieces 50 includes a base 54 extending in the X-axis direction in the XY plane, for example, and a wall 55 standing in the Z-axis direction with respect to the base 54 and extending in the X-axis direction in the XZ plane. The base 54 has an opening 54K, and a screw 52 inserted in the opening 54K is engaged in a screw hole 51H provided in the substrate 51 (FIG. 5B), thereby fixing the substrate 51 and the base 54 (the piece 50). Herein, providing a margin for dimensions of the opening 54K makes it possible to adjust the relative positions of the respective pieces 50 with respect to the substrate 51 in the X-axis direction and the Y-axis direction. The base 54 and a shelf section 414 provided to the beam 41 (41B) of the back chassis 4 interpose an optical sheet 2 (FIGS. 5A and 5B). The shelf section 414 is fixed to the wall 412 of the beam 41 (41B). The base 54 includes a plurality of ribs 54L extending in the Y-axis direction. Presence of the ribs 54L increases strength of the base 54, which enables the piece 50 to sufficiently support even the display panel 3 having weight increased with increase in size. The wall 55 overlaps a portion of the wall 412 of the beam 41 (41B). The wall 55 has an opening 55K, and a screw 53 inserted in the opening 55K is engaged in a screw hole 412H provided in the wall 412 (FIG. 5B), thereby fixing the wall 412 of the beam 41 (41B) and the wall 55 of the piece 50. Herein, it is preferable not to tighten the wall 55 against the wall 412 too much through using a stepped screw as the screw 53 or interposing a washer or the like that has a predetermined height between the screw 53 and the wall 412. This is not to apply stress locally to the end surface 3T of the display panel 3 in a case where the wall surface 54T1 of the locking section 54T abuts the end surface 3T of the display panel 3. A reason for this is because, in a case where the display panel 3 uses, for example, a liquid crystal display element, degradation of image quality may occur such as an image taking on a white tinge only in a portion where strong stress is applied.

Moreover, a thickness of the base 54 of each piece 50 preferably decreases toward a center portion in the extending direction of the substrate 51, i.e. toward a center portion of the display device 100. For example, as illustrated in FIG. 8, the bottom surface 54T2 of the base 54 in each of the plurality of pieces 50A to 50D preferably bends to form, as a whole, a curve bulging forward (toward the +Z direction) as getting closer to a center portion of the display panel 3. This causes the display panel 3 to also bend so as to bulge forward along such a bending bottom surface 54T2 of the base 54. It is to be noted that the bottom surface 54T2 is a specific example corresponding to a "first opposed surface" of the present disclosure.

(Bezel 6)

The bezel 6 is a frame member used to protect mainly each of peripheries of the back chassis 4, the middle chassis 5, and the display panel 3 and to improve esthetics. The bezel 6 is divided into four portions, for example, as illustrated in FIG. 1. Among them, for example, one extending in the X-axis direction along the upper end of the display panel 3 is referred to as a bezel 6A, one extending in the X-axis direction along the lower end of the display panel 3 is referred to as a bezel 6B, one extending in the Y-axis direction along the right end of the display panel 3 is referred to as a bezel 6C, and one extending in the Y-axis direction along the left end of the display panel 3 is referred to as a bezel 6D. The bezels 6A to 6D have a substantially same configuration. Accordingly, description is given below with use of the bezel 6A as a representative example.

As illustrated in FIG. 2, the bezel 6 (6A) is a member disposed to surround the outer edge of the display panel 3 and an outer edge of the back chassis 4, and includes a front portion 61, a rear portion 62, and an intermediate portion 63. The front portion 61 is a portion extending in the X-axis direction in the XY plane and disposed to interpose the periphery of the display panel 3 between the front portion 61 and the bottom surface 54T2 of the middle chassis 5A, and includes an inner surface 61S as a second opposed surface opposed to the periphery of the display panel 3. The inner surface 61S bends forward (toward the +Z direction) as getting closer to the center portion of the display panel 3, as illustrated in FIG. 9, for example. That is, the inner surface 61S forms a recessed surface toward a rearward direction (a −Z direction). Accordingly, the display panel 3 interposed between the bezel 6 (6A) and the middle chassis 5 (5A) is in a state of bending so as to bulge forward along the shape of the inner surface 61S and the shape of the bottom surface 54T2. Similarly forming the inner surface 61S of the front portion 61 of each of the bezels 6B to 6D and the bottom surface 54T2 of each of the middle chassis 5B to 5D causes the display panel 3 to be brought into a state of bending so as to bulge forward as getting closer to the center portion thereof. It is to be noted that, although both the shape of the inner surface 61S of the front portion 61 and the shape of the bottom surface 54T2 of each of the middle chassis 5B to 5D have continuously changing inclination with respect to the XY plane in this embodiment, the present disclosure is not limited thereto. The inclination of the inner surface 61S and the inclination of the bottom surface 54T2 with respect to the XY plane may change in a stepwise manner. Alternatively, the inner surface 61S may have a stepwise shape causing the thickness of the front portion 61 to change in a stepwise manner (thinning in a stepwise manner toward the center portion of the display panel 3). Similarly, the bottom surface 54T2 of the middle chassis 5 may have a stepwise shape causing the thickness of the base 54 of the middle chassis 5 to change in a stepwise manner (thickening in a stepwise manner toward the center portion of the display panel 3). Moreover, it is preferable that the shape of the inner surface 61S coincide with the shape of the bottom surface 54T2, but they may not coincide with each other.

(Light Emitter 1)

FIG. 10 is a perspective view of an overall configuration example of the light emitter 1. Moreover, FIG. 11A is an enlarged perspective view of a main part of the light emitter 1. The light emitter 1 is a so-called backlight unit (surface light emitting unit) that provides the back surface 3B of the display panel 3 with illumination light. The light emitter 1 includes a substrate 11 housed in the back chassis 4 and spreading out in the XY plane and a reflection member 12 disposed in front of the substrate 11 and spreading out in the XY plane. A plurality of light sources 10 are arranged in a matrix on a surface of the substrate 11. The light source 10 is a point light source, which specifically includes an LED (Light Emitting Diode; light emitting diode) that emits white light, for example. One of the plurality of light sources 10 is provided for each of a plurality of openings 13K disposed in the reflection member 12.

The reflection member 12 is a member having a function of performing an optical effect on incident light such as reflection, diffusion, and scattering. The reflection member 12 includes a plurality of divided panels 13 spaced from one another in the XY plane. That is, the plurality of divided panels 13 are arranged in a matrix in the XY plane to form the reflection member 12 as a single reflector. Each of the divided panels 13 has a plurality of openings 13K into which light sources 10 are inserted. The openings 13K each have an inner surface 13S that surrounds the light source 10 and is inclined with respect to the substrate 11. It is to be noted that a planar shape of the opening 13K is not limited to be circular as illustrated in FIGS. 10 and 11A, but may be of any other shape such as an oval shape or a polygonal shape. A center point of the opening 13K in the XY plane preferably coincides with an optical axis of the light source 10.

The divided panel 13 is fabricated by machining out of a plate-like member, for example, or by injection molding or heat press molding. Examples of a constituent material of the divided panel 13 include polycarbonate resin, acrylic resin such as PMMA (polymethyl methacrylate resin), polyester resin such as polyethylene terephthalate, amorphous copolymer polyester resin such as MS (copolymer of methyl methacrylate and styrene), polystyrene resin, and polyvinyl chloride resin.

The plurality of divided panels 13 are fixed to the back chassis 4 so as to have a gap 13G therebetween, as illustrated in FIG. 11A, for example. Each of the plurality of divided panels 13 is fixed to at least one of, for example, the pillars 42A and 42B, the sub-pillars 43A to 43D, and the sub-beams 44A to 44E of the back chassis 4 with a screw 14 (FIG. 11A) or the like. Presence of the gap 13G makes it possible to avoid interference between adjacent divided panels 13 even in a case where each of the divided panels 13 expands or contracts due to increase in temperature accompanied by change in atmospheric temperature or turning-on of the light source 10, or decrease in temperature accompanied by turning-off of the light source 10. That is, it is possible to suppress distortion of the reflection member 12 or displacement thereof with respect to the light source 10 caused by expansion and contraction of each of the divided panels 13. However, it is also conceivable that provision of the gap 13G may cause a dark line caused by the gap 13G to be recognized by the observer through the display panel 3. Thus, as illustrated in FIG. 11B, for example, it is desirable to dispose cover members 15 (15A to 15D) as appropriate so as to overlap the gaps 13G generated between adjacent ones of the plurality of divided panels 13. This makes it possible to suppress occurrence of the dark line and avoiding degradation of a luminance distribution in the XY plane. In an example illustrated in FIG. 11B, the gap 13G between the divided panel 13A and the divided panel 13B (FIG. 11A) is covered by the cover member 15A, and the gap 13G between the divided panel 13B and the divided panel 13C (FIG. 11A) is covered by the cover member 15B. Furthermore, the gap 13G between the divided panel 13C and the divided panel 13D (FIG. 11A) is covered by the cover member 15C, and the gap 13G between the divided panel 13D and the divided panel 13A (FIG. 11A) is covered by the cover member 15D. It is to be noted that each of the cover members 15 is also fixed to at least one of the pillars 42A and 42B, the sub-pillars 43A to 43D, and the sub-beams 44A to 44E with the screw 14. The cover member 15 may include a material of the same kind as the material of the divided panel 13 and, in such a case, it is possible to reflect, toward the back surface 3B of the display panel 3, a plurality of light beams emitted from the light sources 10.

(Optical Sheet 2)

The optical sheet 2 is disposed between the display panel 3 and the light emitter 1, and placed on the shelf section 414 of the beam 41 of the back chassis 4 as illustrated in FIGS. 2, 5A, and 5B, for example. The optical sheet 2 is disposed to cover all over the reflection member 12. The optical sheet 2 is a stack of a plurality of sheets such as a diffuser plate, a diffuser sheet, a lens film, and a polarization separating sheet. Providing such an optical sheet 2 makes it possible to direct light diagonally emitted from the light source 10 and light diagonally outputted from the reflection member 12 to the forward direction (the Z direction), thereby further increasing front luminance.

(Display Panel 3)

The display panel 3 includes a display surface 3A that displays a moving image or a still image in a forward direction, the back surface 3B on a side opposite to the display surface 3A, and the end surface 3T that joins the display surface 3A and the back surface 3B. The display panel 3 is, for example, a transmissive liquid crystal display panel including a liquid crystal layer disposed between, for example, a TFT substrate and a color filter substrate. Light coming from the light emitter 1 via the optical sheet 2 enters the back surface 3B and exits from the display surface 3A. The display panel 3 may further include a polarizer plate or the like.

[Workings and Effects of Display Device 100]

In the display device 100, light emitted from the light source 10 of the light emitter 1 spreads to all directions across 360 degrees from a light emission point of the light source. Thereafter, the light directly enters the optical sheet 2, or indirectly enters the back side of the optical sheet 2 after being reflected by the surfaces of the reflection member 12, the substrate 11, etc. The light having entered the back side of the optical sheet 2 passes through the optical sheet 2 to exit from the front surface, and then is applied to the display panel 3 as surface-emitted light. Appropriate image display corresponding to an image signal is performed on the display panel 3 through selectively transmitting the light from the light emitter 1.

The display device 100 adopts the back chassis 4 as a frame structure having a plurality of extrusion molded members coupled to one another, and the display panel 3 is held via the middle chassis 5. This makes it possible to suppress increase of weight of the display device itself due to the increased screen size compared to, for example, a display device having a configuration in which the display panel is held by a housing fabricated by press-molding a single sheet metal. Thus, deformation is less likely to be caused by its own weight despite its thin shape. Accordingly, the display device 100 makes it possible to achieve a configuration suitable for increasing the screen size and reducing the thickness while ensuring adequate strength.

Specifically, the pair of beams 41, the pair of pillars 42, the plurality of sub-pillars 43, etc. are extrusion molded members. This makes it possible to quickly manufacture, in large amounts, the beams 41, the pillars 42, and the sub-pillars 43 presenting less dimensional error and having homogeneous material composition. Moreover, there is no need of using a mold, unlike a press-molded product. Thus, it can be said that the display device 100 has an advantageous configuration in terms of cost.

It is to be noted that to manufacture the back chassis 4, it is preferable to use a dedicated jig including, for example, a horizontally placed flat plate provided with a plurality of walls and recesses as references for positioning the respective extrusion molded members such as the beams 41, the pillars 42, and the sub-pillars 43. Use of such a jig makes it possible to adjust the positions of the respective extrusion molded members so as to achieve appropriate relative positions and then to fasten the plurality of extrusion molded members to each other. As a result, this makes it possible to easily reduce the dimensional error of the back chassis 4 after assembling deriving from the dimensional error of each of the extrusion molded members.

Moreover, the display device 100 has a configuration in which the middle chassis 5 adjusts the plurality of pieces 50 and holds the plurality of pieces 50 at suitable positions with respect to a single substrate 51. Specifically, the plurality of pieces 50 are held by the substrate 51 in a state in which the positions thereof with respect to the substrate 51 are adjusted to include the respective wall surfaces 54T1 abutting the end surface 3T of the display panel 3 substantially in a same plane. This makes it possible to relax locally generated stress compared to a case where, for example, a single long middle chassis holds the entire end surface on one side of the display panel 3. The long middle chassis easily causes dimensional error or dimensional variation in the longitudinal direction due to deformation during or after manufacturing. In contrast, in this embodiment, it is possible to adjust the relative positions of the plurality of pieces 50 after manufacturing the plurality of pieces 50; therefore, this embodiment not directly influenced by manufacturing error itself and deformation after manufacturing are not exerted. Local stress is less likely to be applied to the display panel 3, which makes it possible to prevent deflection or distortion of the display panel 3 and consequently avoid local degradation of image quality near an end edge of the display panel 3.

Moreover, in the display device 100, the reflection member 12 includes the plurality of divided panels 13 spaced apart from one another in the XY plane. This makes it possible to reduce deviations of relative positions between the plurality of light sources 10 and the plurality of openings 13K corresponding to the respective light sources 10 even in a case where the expansion and contraction of the reflection member 12 occur during use. Thus, it is possible to suppress the variation of the luminance distribution accompanied by overheat of the reflection member 12, thereby avoiding degradation of the image quality. Specifically, in a case where the gap 13G is covered by the cover member 15, it is possible to prevent occurrence of the dark line and obtain a flatter luminance distribution with the light emitter 1, thereby sufficiently suppressing an influence on the image quality.

Moreover, shaping the bottom surface 54T2 of the middle chassis 5 and the inner surface 61S of the bezel 6 into a bending surface causes the display panel 3 to be also bent so as to bulge forward as getting closer to the center portion thereof. This makes it possible to avoid contact between the display panel 3 and the optical sheet 2 even in a case where a space therebetween (distance in the Z-axis direction) is reduced. Thus, the display device 100 has a configuration suitable for both increasing the size and reducing the thickness.

2. Other Modification Examples

Although the present disclosure has been described with reference to the embodiment, the present disclosure is not limited to the above-described embodiment, and may be modified in a variety of ways. For example, the positions and shapes of the back chassis 4, the middle chassis 5, the bezel 6, and the like described in the above-described embodiment are illustrative and non-limiting.

Moreover, the dimensions, dimensional ratios, and shapes of respective components illustrated in the respective drawings are merely examples, and the present disclosure is not limited thereto. Furthermore, each component is not limited to a case where the component includes a single part, and may include two or more parts.

Moreover, the LED is used as the light source 10 in the above embodiment; however, a semiconductor laser or the like may also be used as the light source 10.

Furthermore, the display device described in the above-mentioned embodiment, etc. is not limited to a case where all the components described above are included, and may exclude some components or may further include other components.

For example, the display device 100 described in the above-described embodiment, etc. may further include a rear cover that covers the back surface of the back chassis 4 (a surface opposite from the display panel 3). The rear cover may include, for example, polystyrene (PS: polystyrene), a mixture of polystyrene and polyphenyleneether (PPE: polyphenyleneether), or the like. The display device 100 may further include an additional decorative member. The rear cover may be provided with a substrate including a drive circuit that drives the light emitter 1, or a tuner.

Moreover, the display device 100 described in the above-described embodiment, etc. is not limited to a television set used in a household, and may include a wide variety of display devices that display information indoors and outdoors. Furthermore, the display device 100 also has applicability to various medical devices (such as an endoscopic surgical system, an operating room system, and a microscopic surgery system).

It is to be noted that the effects described herein are merely examples and not limited thereto, and other effects may be included. Moreover, the present technology may have the following configurations.

(1)
A display device, including:
a frame structure having a plurality of extrusion molded members coupled to one another;
a display panel; and
an intermediate member attached to the frame structure and holding the display panel.

(2)
The display device according to (1), in which
the frame structure includes:
a first beam and a second beam both extending in a horizontal direction;
a first pillar and a second pillar both extending in a vertical direction and joining both ends of the first beam and the second beam, and
a plurality of sub-pillars disposed between the first pillar and the second pillar and extending in the vertical direction to join the first beam and the second beam.

(3)
The display device according to (2), in which
a rib extending in each longitudinal direction is formed in at least one of the first beam, the second beam, the first pillar, the second pillar, and the plurality of sub-pillars.

(4)
The display device according to (2) or (3), further including a surface light emitting unit, in which
the display panel is a transmissive liquid crystal display panel having a display surface that displays an image, a back surface on a side opposite to the display surface, and an end surface that joins the display surface and the back surface, and
the surface light emitting unit is disposed inside the frame structure and applies light to the back surface of the display panel.

(5)
The display device according to (4), in which
the surface light emitting unit includes:
a plurality of light emitting elements each emitting the light; and
a reflection member that reflects a plurality of rays of the light emitted from the respective plurality of light emitting elements toward the display panel, and
the plurality of light emitting elements and the reflection member are fixed to at least one of the first pillar, the second pillar, and the plurality of sub-pillars.

(6)
The display device according to (5), in which
the reflection member includes:
a plurality of divided panels spaced from one another in an in-plane direction of the display panel and each fixed to at least one of the first pillar, the second pillar, and the plurality of sub-pillars.

(7)
The display device according to (6), in which
the reflection member further includes:
a plurality of cover members that are disposed to overlap a gap between the plurality of divided panels and reflect the plurality of rays of the light emitted from the respective plurality of light emitting elements toward the display panel.

(8)
The display device according to any one of (1) to (7), in which the display panel has a display surface that displays an image, a back surface on a side opposite to the display surface, and an end surface that joins the display surface and the back surface,
the intermediate member has a substrate extending along an outer edge of the display panel, and a plurality of pieces disposed along a longitudinal direction of the substrate and held by the substrate to make respective relative positions to the substrate adjustable, and
each of the plurality of pieces includes an abutment surface abutting the end surface of the display panel.

(9)
The display device according to (8), in which
the plurality of pieces are held by the substrate in a state in which the relative positions to the substrate are adjusted to include the respective abutment surfaces substantially in a same plane.

(10)
The display device according to any one of (1) to (7), in which
the display panel has a display surface that displays an image in a forward direction, a back surface on a side opposite to the display surface, and an end surface that joins the display surface and the back surface, and bends to bulge forward as getting closer to a center portion of the display panel.

(11)
The display device according to (10), in which
the intermediate member includes a first opposed surface opposed to a periphery of the back surface of the display panel, and
the first opposed surface bends to bulge forward as getting closer to the center portion of the display panel.

(12)
The display device according to (11), further including a bezel disposed to surround outer edges of the display panel and the frame structure, in which
the bezel includes a second opposed surface disposed to interpose the display panel between the second opposed surface and the first opposed surface of the intermediate member, and opposed to a periphery of the display surface of the display panel, and
the second opposed surface is recessed forward as getting closer to the center portion of the display panel.

(13)
The display device according to (4), further including an optical sheet between the display panel and the surface light emitting unit.

This application claims the priority of Japanese Priority Patent Application No. 2016-139989 filed with the Japanese Patent Office on Jul. 15, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A display device, comprising:
a frame structure having a plurality of extrusion molded members coupled to one another, the frame structure including a first beam and a second beam both extending in a horizontal direction, and a first pillar and a second pillar both extending in a vertical direction and joining both ends of the first beam and the second beam, wherein each of the first pillar and the second pillar are joined to both ends of the first beam and the second beam by respective L-shaped metal fittings;

a display panel;

an intermediate member attached to the frame structure and holding the display panel, the intermediate member having a substrate, apart from the display panel, extending along an outer edge of the display panel, and a plurality of pieces disposed along a longitudinal direction of the substrate and held by the substrate to set respective relative positions, each of the plurality of pieces including an abutment surface abutting the end surface of the display panel; and a surface light emitting unit comprising a plurality of light emitting elements arranged on a surface of the surface light emitting unit, wherein the display panel is a transmissive liquid crystal display panel having a display surface that displays an image, a back surface on a side opposite to the display surface, and an end surface that joins the display surface and the back surface, and the surface light emitting unit is disposed inside the frame structure with the surface of the surface light emitting unit facing the back surface of the display panel so that the light from the light emitting elements is applied directly from the surface of the surface light emitting unit toward the back surface of the display panel.

2. The display device according to claim 1, wherein the frame structure includes:

a plurality of sub-pillars disposed between the first pillar and the second pillar and extending in the vertical direction to join the first beam and the second beam.

3. The display device according to claim 2, wherein a rib extending in each longitudinal direction is formed in at least one of the first beam, the second beam, the first pillar, the second pillar, and the plurality of sub-pillars.

4. The display device according to claim 1, wherein the surface light emitting unit includes:

a reflection member that reflects a plurality of rays of the light emitted from the respective plurality of light emitting elements toward the display panel, and the plurality of light emitting elements and the reflection member are fixed to at least one of the first pillar, the second pillar, and the plurality of sub-pillars.

5. The display device according to claim 4, wherein the reflection member includes:

a plurality of divided panels spaced from one another in an in-plane direction of the display panel and each fixed to at least one of the first pillar, the second pillar, and the plurality of sub-pillars.

6. The display device according to claim 5 wherein the reflection member further includes:

a plurality of cover members that are disposed to overlap a gap between the plurality of divided panels and reflect the plurality of rays of the light emitted from the respective plurality of light emitting elements toward the display panel.

7. The display device according to claim 1, wherein the plurality of pieces are held by the substrate in a state in which the relative positions to the substrate are adjusted to include the respective abutment surfaces substantially in a same plane.

8. The display device according to claim 1, wherein the display panel bends to bulge forward as getting closer to a center portion of the display panel.

9. The display device according to claim 8, wherein the intermediate member includes a first opposed surface opposed to a periphery of the back surface of the display panel, and the first opposed surface bends to bulge forward as getting closer to the center portion of the display panel.

10. The display device according to claim 9, further comprising a bezel disposed to surround outer edges of the display panel and the frame structure, wherein the bezel includes a second opposed surface disposed to interpose the display panel between the second opposed surface and the first opposed surface of the intermediate member, and opposed to a periphery of the display surface of the display panel, and the second opposed surface is recessed forward as getting closer to the center portion of the display panel.

11. The display device according to claim 1, further comprising an optical sheet between the display panel and the surface light emitting unit.

12. A display device comprising:

a frame structure having a plurality of extrusion molded members coupled to one another, the frame structure including a first beam and a second beam both extending in a horizontal direction, and a first pillar and a second pillar both extending in a vertical direction and joining both ends of the first beam and the second beam;

sub-pillars between the first and second pillars;

a display panel;

an intermediate member attached to the frame structure and holding the display panel, the intermediate member having a substrate, apart from the display panel, extending along an outer edge of the display panel, and a plurality of pieces disposed along a longitudinal direction of the substrate and held by the substrate to set respective relative positions, each of the plurality of pieces including an abutment surface abutting the end surface of the display panel; and a surface light emitting unit that includes a plurality of light sources, and a reflection member that reflects a plurality of rays of the light emitted from the respective plurality of light emitting elements toward the display panel, wherein the reflection member is fixed to at least one of the first pillar, the second pillar, and one of the sub-pillars, wherein the display panel is a transmissive liquid crystal display panel having a display surface that displays an image, a back surface on a side opposite to the display surface, and an end surface that joins the display surface and the back surface, and wherein the surface light emitting unit is disposed inside the frame structure and applies light to the back surface of the display panel.

* * * * *